United States Patent [19]
Doyle

[11] Patent Number: 6,009,455
[45] Date of Patent: Dec. 28, 1999

[54] DISTRIBUTED COMPUTATION UTILIZING IDLE NETWORKED COMPUTERS

[76] Inventor: John F. Doyle, 514 Limerick Cir., Unit 103, Timonium, Md. 21093

[21] Appl. No.: 09/063,257

[22] Filed: Apr. 20, 1998

[51] Int. Cl.[6] .............................. G06F 13/00; G06F 15/16
[52] U.S. Cl. .......................... 709/201; 709/106; 709/205
[58] Field of Search ..................................... 709/102, 105, 709/106, 201, 202, 203, 204, 205, 208, 220, 223, 226, 248, 300

[56] References Cited

U.S. PATENT DOCUMENTS

| | | | |
|---|---|---|---|
| 4,918,596 | 4/1990 | Nakano | 709/105 |
| 5,155,808 | 10/1992 | Shimizu | 709/202 |
| 5,428,783 | 6/1995 | Lake | 709/106 |
| 5,546,594 | 8/1996 | Wazumr | 709/102 |
| 5,790,431 | 8/1998 | Ahrens, Jr. et al. | 709/104 |

*Primary Examiner*—Viet D. Vu

[57] ABSTRACT

The present invention utilizes the otherwise unproductive minutes and hours when a networked client computer is not in use by a local human operator. The method and system described herein allow multiple partitioned computations to be queued for distribution to any number of client computers when the clients indicate their availability. Availability may be determined by the same criteria used to activate screen-saver programs, i.e., a predetermined time without any keyboard or mouse input. Application programs are designed to accept a common calling sequence. An application-independent master control program coordinates the distribution of computation segments, the combination of partial results, and the formatting of the final result. An application-independent client control program reports availability of client computers, downloads application program files, invokes the application to compute partial results for a range of computation segments, and uploads the partial results to the master computer. One class of distributed computation supported is finding the minimum or maximum value of a calculated target cell in a spreadsheet, based on a number of input cells taking values within a specified range.

20 Claims, 16 Drawing Sheets

Spreadsheet Submission Form

| SPREADSHEET | File Name | | | |
|---|---|---|---|---|
| SOLVE | Cell Name | Minimize/Maximize | | Report Name |
| PARAM | Cell Name | From Value | To Value | Step Value | Report Name |
| PARAM | Cell Name | From Value | To Value | Step Value | Report Name |
| PARAM | Cell Name | From Value | To Value | Step Value | Report Name |
| PARAM | Cell Name | From Value | To Value | Step Value | Report Name |

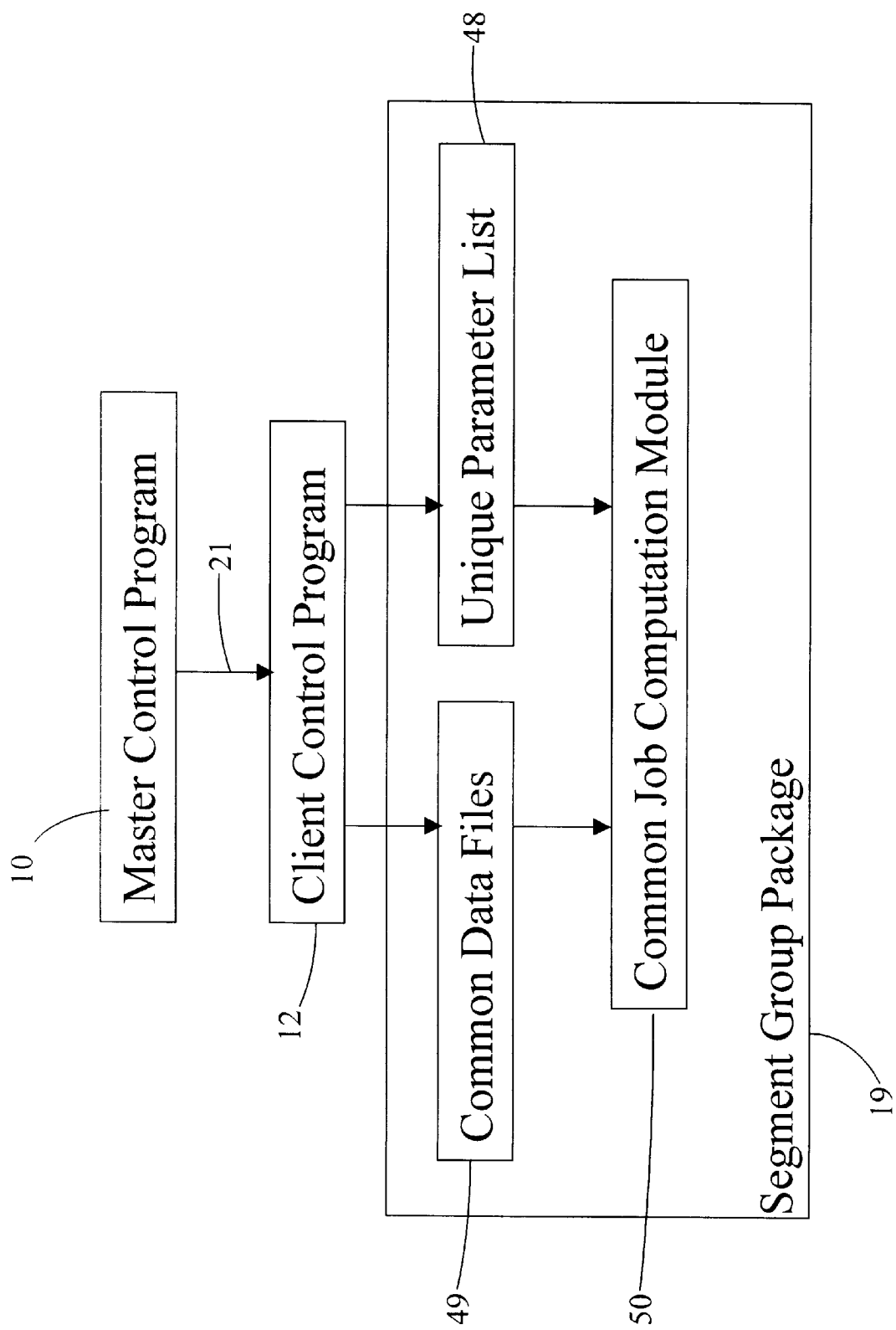

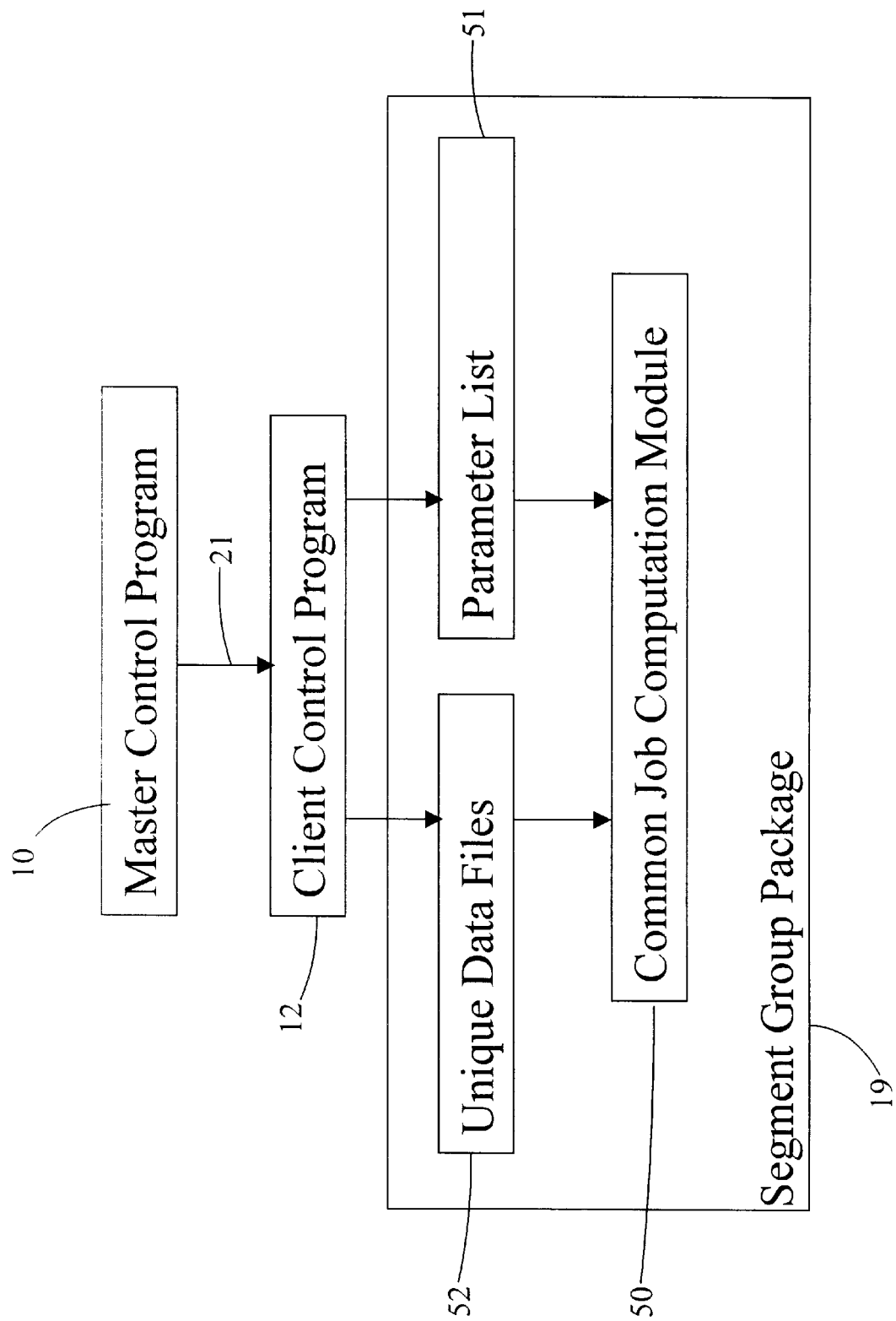

DISTRIBUTED COMPUTATION UTILIZING IDLE NETWORKED COMPUTERS

FIELD OF INVENTION

The present invention is related to distributed computation, particularly calculations which can be partitioned for loosely coupled distributed computer systems.

DESCRIPTION OF PRIOR ART

Certain classes of mathematical problems are suitable for partitioning and solution on multiple computers that are only loosely coupled by a communications network. The prior art comprise systems in which the constituent computers are at least partially or temporarily dedicated to the solution of a particular problem. Computers intended to take part in such problems are typically identified prior to commencement of the computation activity. They are loaded with the appropriate software to perform partitioned calculations as well as communicate with each other or with a master, coordinating computer. A limitation of such systems is the cost of provisioning computers. The benefits of solving certain problems within a time constraint must be balanced with the cost to provide or make available sufficient computer power and network bandwidth to accomplish the solution. Furthermore, it is difficult to develop correct and robust distributed algorithms that can tolerate unreliable communications networks. This limits the pool of computers or adds cost in either additional programming effort or fault tolerant networks.

The growth of client/server computer networks, including the Internet, has resulted in a large number of computers that are connected to one another and whose primary use is other than computation of partitioned mathematical problems. Uses include word processing, sales entry, Internet browsing, spreadsheet analysis, software development, computer aided design, and the myriad other uses for which desktop computers are purchased by businesses or consumers. Many of these computers are permanently connected to at least a local area network, if not a wide area network or the Internet. Most of these computers are not used productively during off-hours, lunch breaks, and other times when a human operator is not at the keyboard.

SUMMARY OF THE INVENTION

The present invention exploits the otherwise unproductive minutes and hours when a networked client computer is not in use by a local human operator. The method and system described herein allow multiple partitioned computations to be queued for distribution to any number of client computers when the clients indicate their availability. Availability may be determined by the same criteria used to activate screen-saver programs, i.e., a predetermined period without any keyboard or mouse input. Network failures are well tolerated, making the invention applicable to error-prone networks such as the Internet.

A wide variety of problems can be solved by programs adapted to the invention's distributed computing method and system. Of particular advantage in the invention's preferred embodiment is a feature that allows spreadsheet-based optimization calculations to easily be formulated and submitted for processing without any knowledge of computer programming.

BRIEF DESCRIPTION OF THE DRAWINGS

FIG. 6 Spreadsheet submission form for non-programmers.

FIG. 8a–c. Variants of Segment Group Packages

REFERENCE NUMERALS IN DRAWINGS

1. Job Request Means
2. Calculation Initiation Signal
3. Job Output Means
4. Job Output Signal
5. Master Computer
6. Application-specific Master Program
7. Network
8. Slave Computer
9. Application-specific Slave Program
10. Master Control Program
11. Client Computer
12. Client Control Program
13. Availability Algorithm
14. Job Computation Module
15. Size Algorithm
16. Availability Signal
17. Available Client
18. Job Request Files
19. Segment Group Package
20. Selected Client
21. Commands and Files
22. Group Result
23. Combine Algorithm
24. Format Algorithm
25. Compute Algorithm
26. Segment Result
27. Common Input Parameter Processor
28. Mode Select algorithm
29. Job Computation Module Parameter Lists
30. Size Parameter List
31. Compute Parameter List
32. Combine Parameter List
33. Format Parameter List
34. Module Name
35. Mode Select parameter
36. In File List
37. Out File List
38. From-segment
39. To-segment
40. Job Request Signal
41. Internal Combine Operation
42. Final Result
43. Spreadsheet Submission Form
44. Job Request Message
45. Qualification Algorithm
46. Assignment Algorithm
47. Job Control Algorithm
48. Unique Parameter List
49. Common Data Files
50. Common Job Computation Module
51. Parameter List
52. Unique Data Files 53. Data Files
54. Unique Executable File

DETAILED DESCRIPTION OF PREFERRED EMBODIMENT

Figure 1:
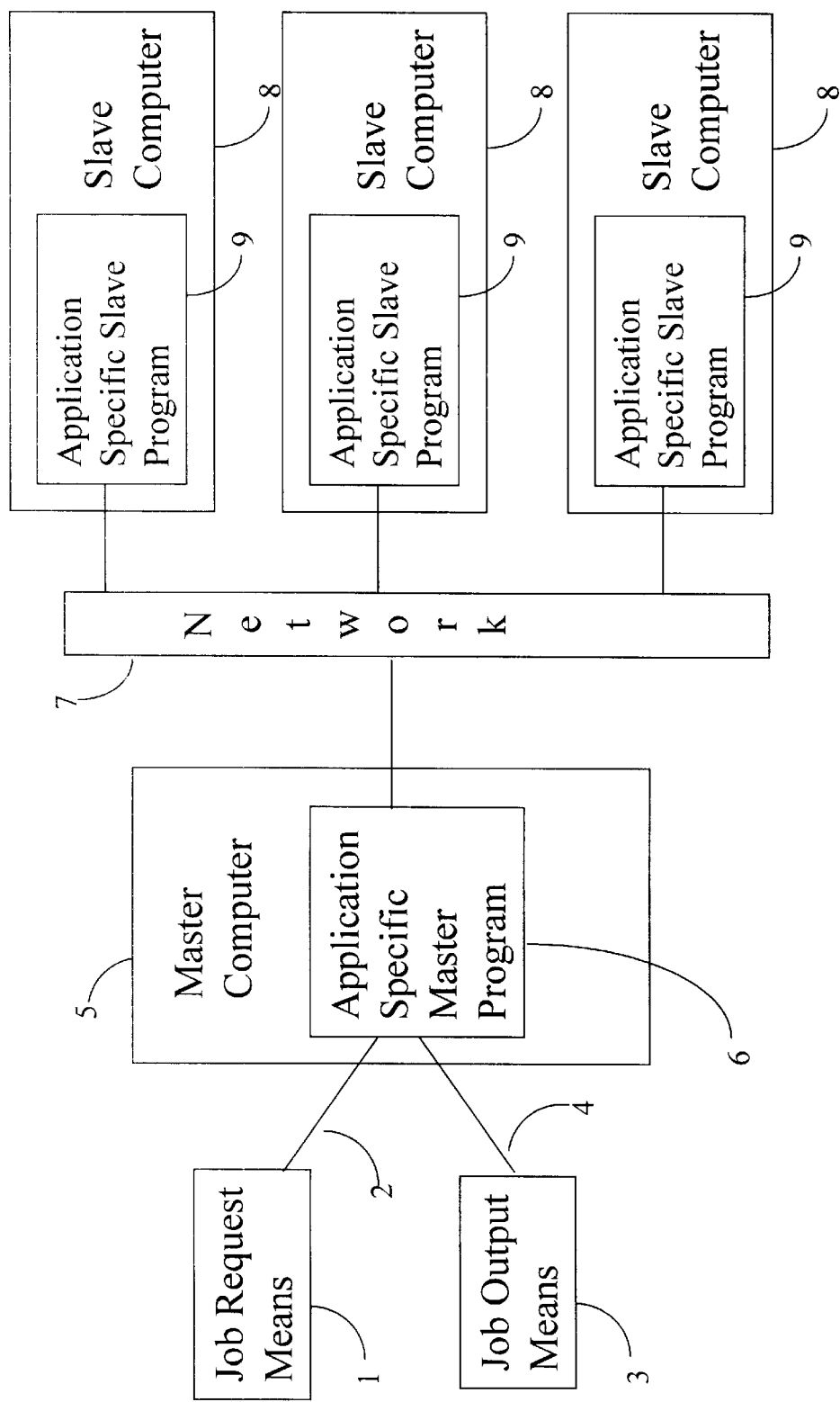
FIG. 1 Prior art showing loosely couple distributed processing of a specific application.

FIG. 1 depicts the prior art of a loosely coupled distributed processing system. A job request means 1 provides a calculation initiation signal 2 to an application-specific master program 6 running in a master computer 5. The job request means may be a terminal, another computer, or a program or portion of a program running on the master computer or another computer. The application-specific master program is designed to partition the calculation indicated in the job request signal into multiple segments. These can then be computed by an application-specific slave program 9 running on slave computers 8 that are connected to the master computer by a network 7. The results generated for each segment are combined by the application-specific master program into a final result that is communicated to a job output means 3 by a job output signal 4. The job output means may be a terminal, another computer, or a program or portion of a program running on the master computer or another computer.

Such systems are limited in several ways. The slave computers are usually not available without some provision cost. They may be purchased explicitly as computation servers. Furthermore, although the computer network may be capable of supporting multiple current applications, each application has a different application-specific master program 6 and slave program 9 that contend rather than cooperate with other applications for system resources. Finally, the programming effort required to develop and debug a particular distributed application is often considerable. Scientific programming expertise and systems programming expertise must both be employed. A mathematically proper partitioning of a problem does not address the failure of a slave computer in mid-computation. In addition to understanding the proper partitioning of calculations, the intricacies of computer networks and fault tolerant program design burden the developer. These limitations are eliminated in the present invention.

Figure 2A:
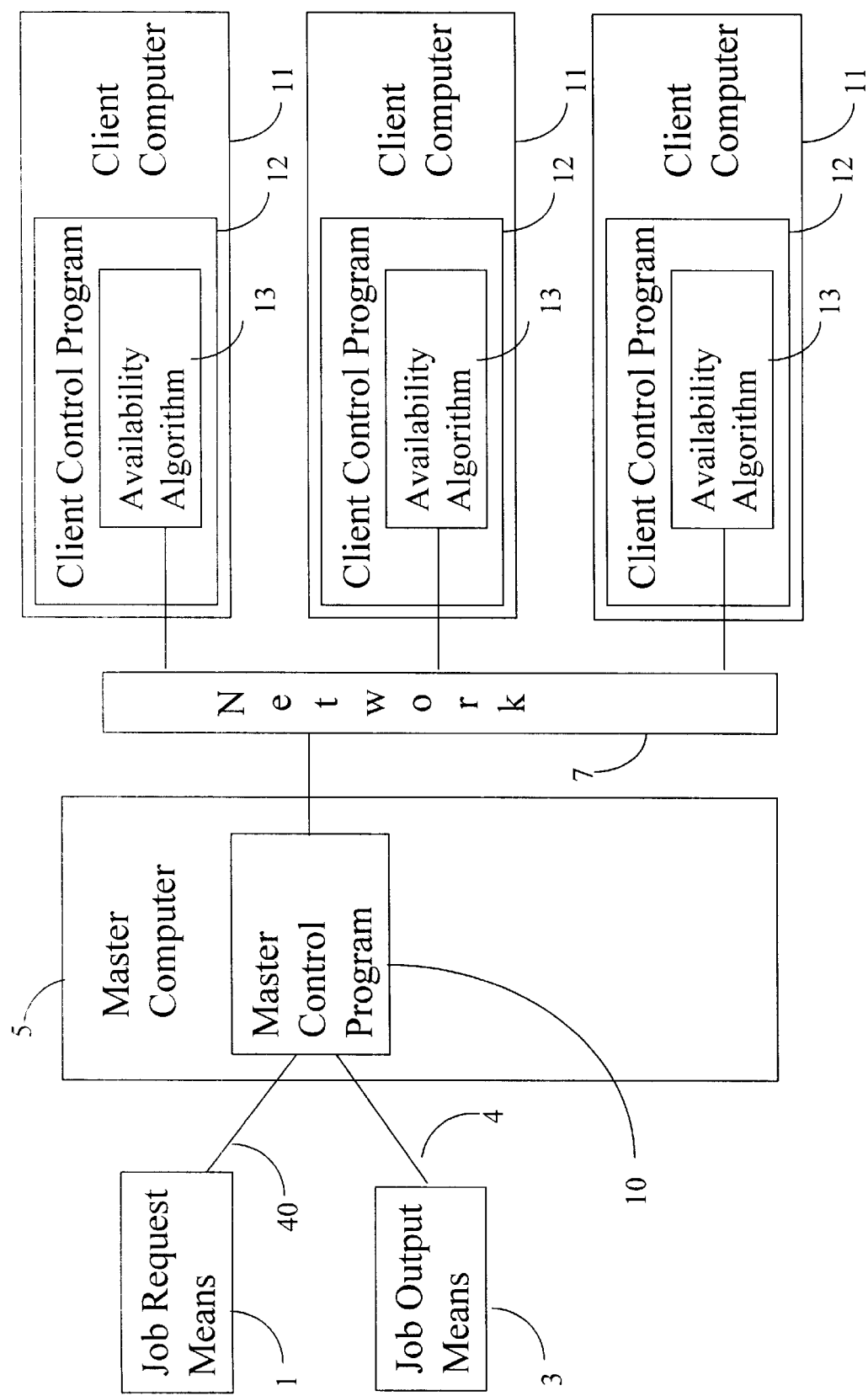
FIG. 2a–f. Generalized distributed computation network utilizing idle time on client computers.

FIG. 2a shows the present invention in an idle state. The job request means 1, master computer 5, network 7, and job output means 3 are common with the prior art as shown in FIG. 1. The master computer executes a master control program 10 that is independent and ignorant of any specific distributed application or calculation. The client computer 11 is a computer connected to a generic local or wide area network. On the client computer is a small application-independent client control program 12 that executes when the client computer is not in normal use. The client control program may be activated by a screen-saver timer function in the operating system or other means of determining a threshold time of inactivity. Alternatively or additionally, it may be activated on a scheduled basis, for example, outside the normal work shift.

When the client control program is initially activated or is in the idle state, it executes an availability algorithm. The primary function of the availability algorithm is to notify the master computer that the client is available. Additionally, the availability algorithm may confirm by predetermined criteria such as user inactivity that the client computer is indeed available for use in distributed computation. It may further evaluate the existence and configuration of various predetermined resources on the client computer. These resource evaluations include but are not limited to:

(a) a particular spreadsheet program is installed on the client computer,
(b) a particular operating system is installed on the client computer,
(c) a particular CPU type or family is installed on the client computer,
(d) a specified amount of disk space is available on the client computer, and
(e) a specified amount of main CPU memory is installed on the client computer.

Figure 2B:
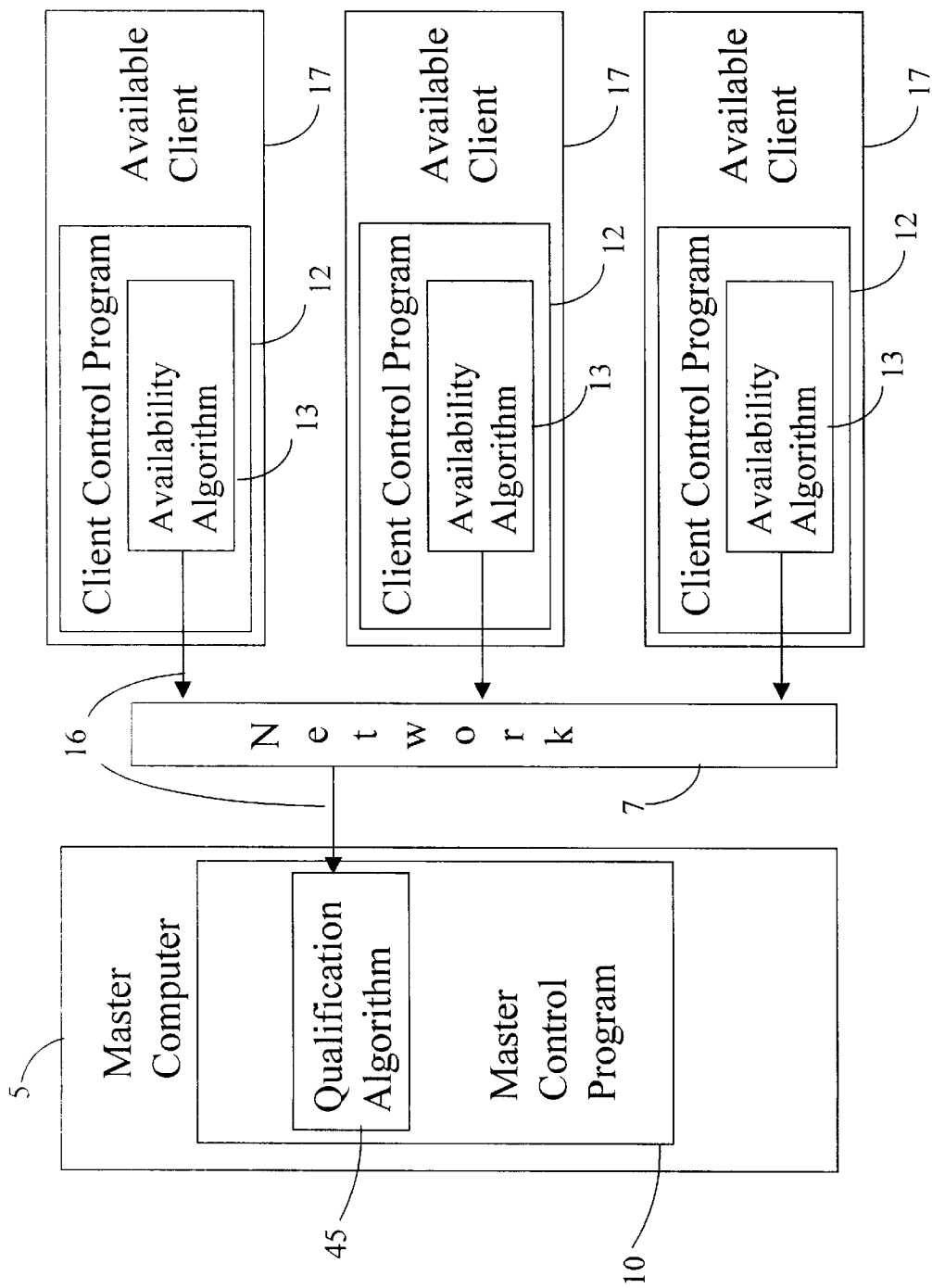

FIG. 2b depicts the present invention when the availability algorithm 13 on each of three client computers has concluded that the respective client computer is an available client 17. An available client 17 is the same computer as the client computer 11 after the availability algorithm has determined that it is indeed available. Each available client sends an availability signal 16 via the network to the master control program. The availability signal indicates the availability of the available client 17 as well as any resource information gathered by the availability algorithm. A qualification algorithm 45 in the master control program determines if an available client is a candidate to participate in a distributed computation. The bases for such determination include the existence on the client of resources required by the particular job request. If the master control program has no work for the available client, an optional idle response (not shown) may be sent.

Figure 2C:
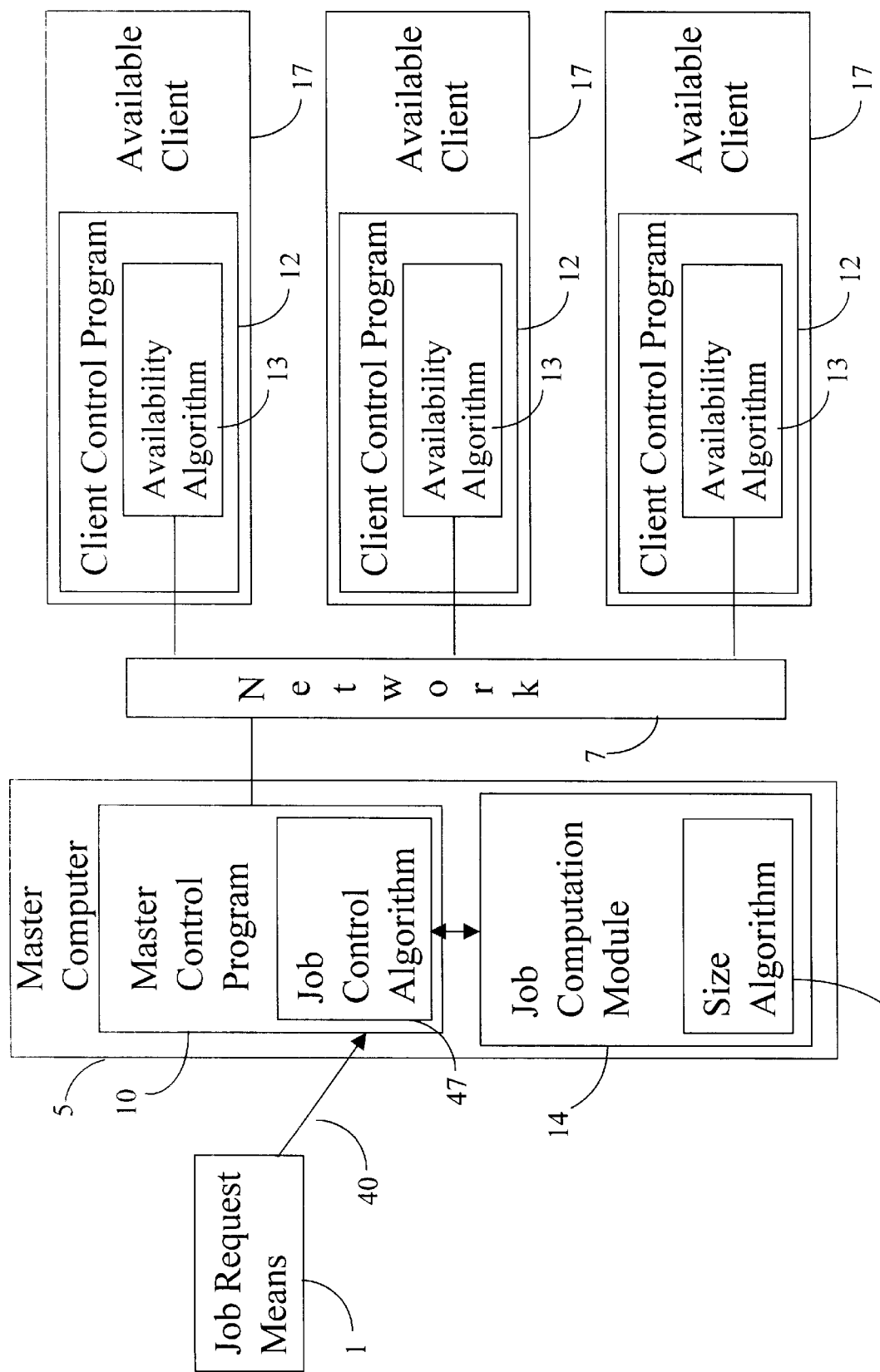
Figure 7:
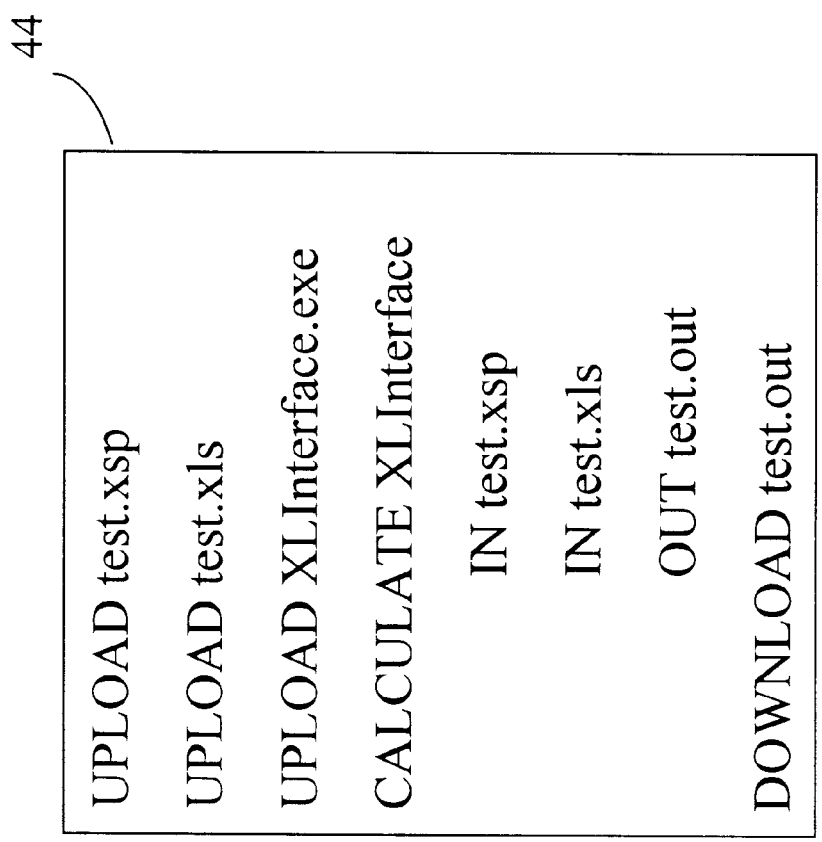
FIG. 7 Contents of a Job Request Message

As shown in FIG. 2c, asynchronously with the client's availability signals, the job request means 1 provides a job request signal 40. Th job request signal includes a job request message 44 as well as a number of files, or references to files already on the master computer, that are required to perform a job. FIG. 7 shows the format of a job request message 44. Upload means copy from the job request means to the master computer. Uploaded files are stored in a job-unique directory to avoid filename conflicts with other jobs. One of the files provided or referred to in the job request signal is an executable file that contains the logic and algorithms specific to a particular problem set. An example is a job computation module 14.

Figure 4:
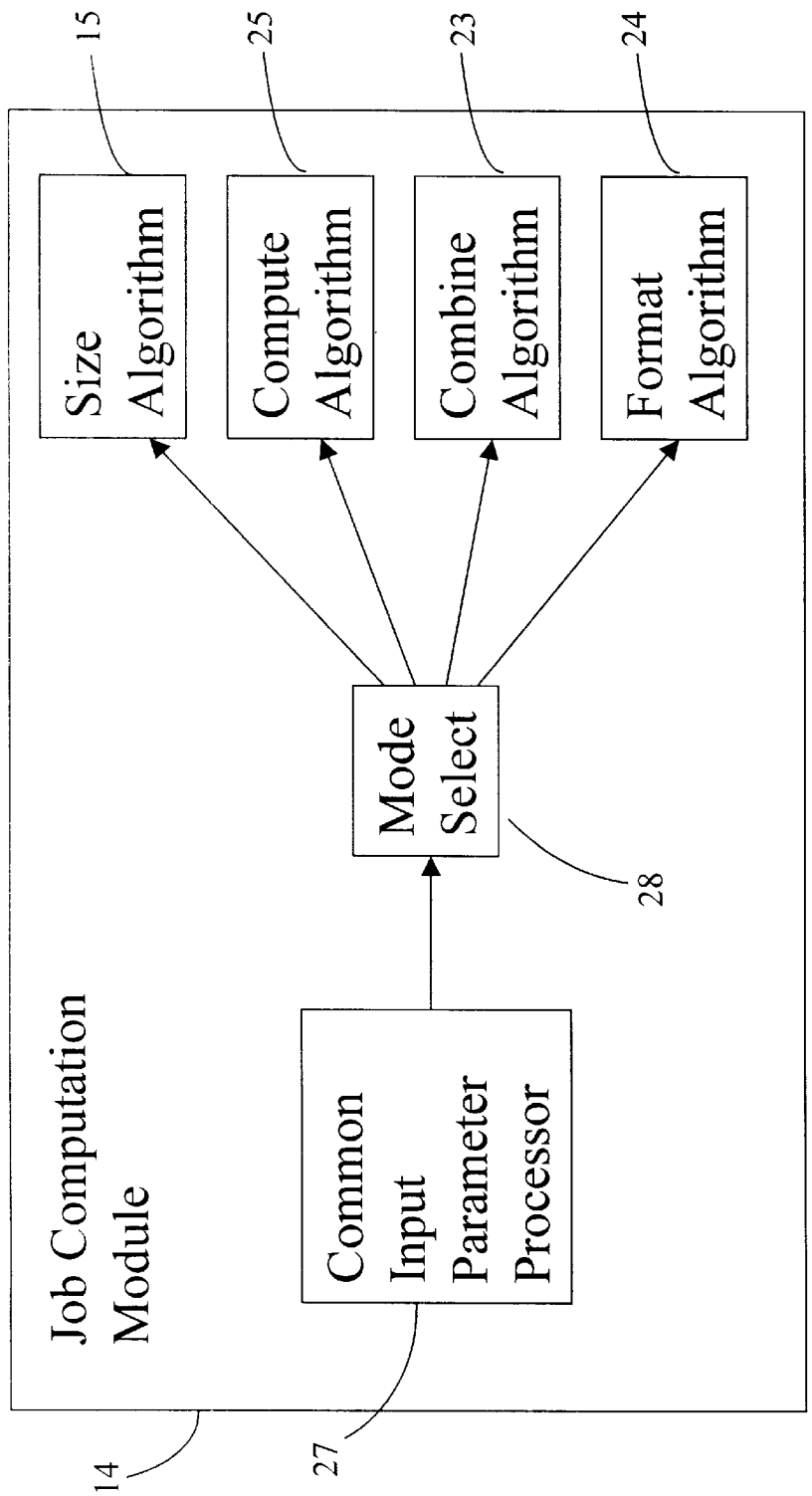
FIG. 4 Common job computation module invoked in four distinct modes.

In the preferred embodiment, the job computation module 14 is a single, applications-specific, executable program that is capable of performing the tasks performed by both the application-specific master program 6 and the application-specific slave program 9 in the prior art of FIG. 1. The job computation module is designed to execute in one of four modes: a size algorithm 15, a compute algorithm 25, a combine algorithm 23, or a format algorithm 24. FIG. 4 depicts a possible structure for initial internal processing of a job computation module. One of the input parameters to the program is detected by a common input parameter processor 27, a software algorithm. This parameter is used to select in which mode the program should operate. The mode select algorithm 28 branches control to the proper algorithm based on the detected input parameter. The appendix contains source code for a simplified job computation module, dummy.c, in which the common input parameter processor 27 is the operating system's command line parser providing function arguments to the entry point function "main".

The job computation module could be implemented as four separate programs; the advantages of using a single module for all four modes will be explained below. The four modes will be described first.

Figure 5:
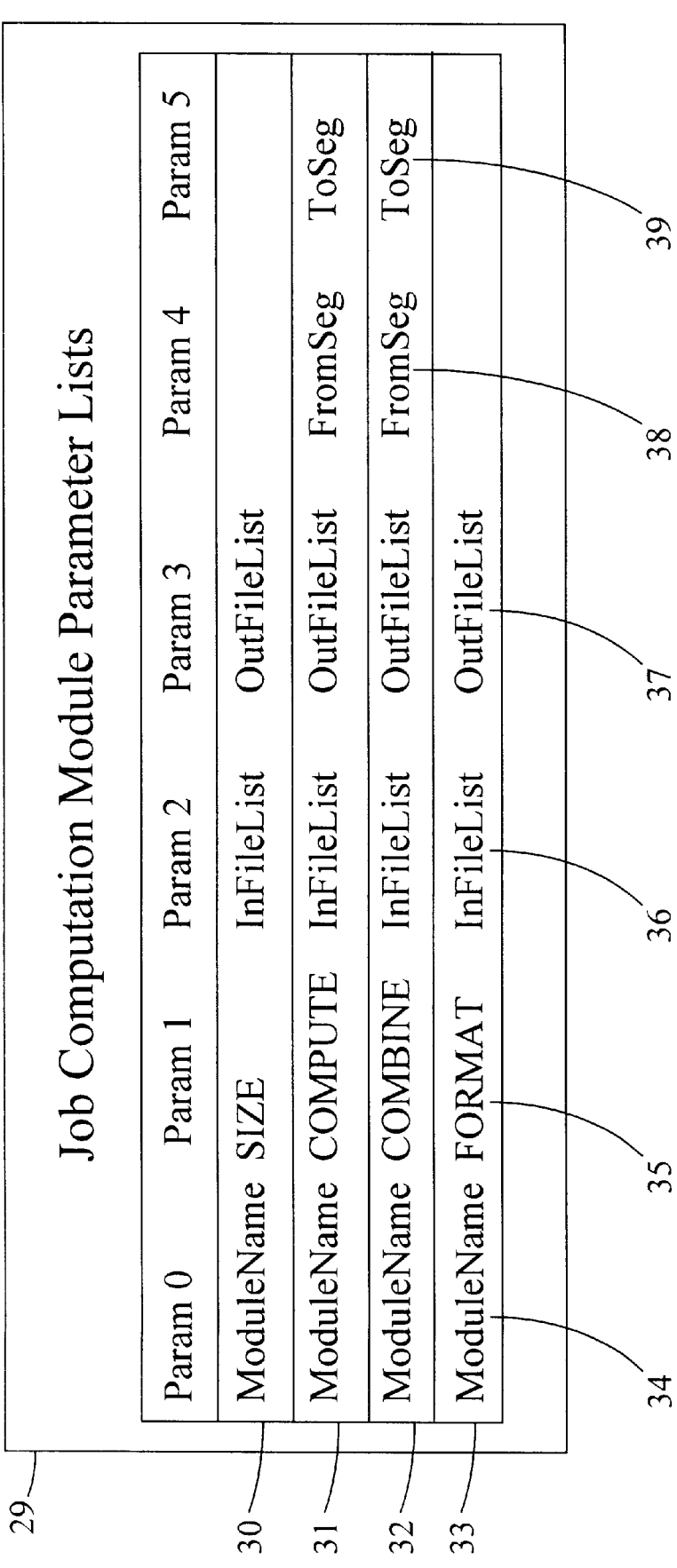
FIG. 5 Parameter list for each of four distinct modes of job computation module.

FIG. 5 shows the job computation module parameter lists 29 for each of the four modes. A module name 34 is provided as the first parameter by many operating systems. It is usually ignored. The second parameter is the mode select parameter 35 that was discussed above in conjunction with the mode select algorithm 28. It has four values corresponding to four mode algorithms: the size algorithm 15, the compute algorithm 25, the combine algorithm 23 and the format algorithm 24.

The third parameter is an in-file list 36, the name of a file that contains the names of every input file required to perform the selected mode algorithm. The fourth parameter is an out-file list 37, the name of a file that contains the names of every file to be created by the selected mode algorithm.

When the job computation module 14 is invoked with a size parameter list 30, the size algorithm 15 reads the in-file list 36, reads any required input files named in the in-file list, and calculates the range of segments into which the problem set can be divided. The resulting integer numbers are output to the first file specified in the out-file list. In certain applications, the size algorithm will also generate other files in preparation for later computation.

When the job computation module 14 is invoked with a compute parameter list 31, the compute algorithm 25 reads the in-file list 36, reads any required input files named in the in-file list, and computes a segment result 26 for each segment in the sequence specified by the from-segment parameter 38 and the to-segment parameter 39. The result is written to one or more output files specified in the out-file list 37.

When the job computation module 14 is invoked with a combine parameter list 32, the combine algorithm 23 reads the in-file list 36, reads any required files from the in-file list, and performs the application-specific logic to combine multiple segment results 26 into a single group result 22. The result is written to one or more output files specified in the out-file list 37.

Figure 3A:
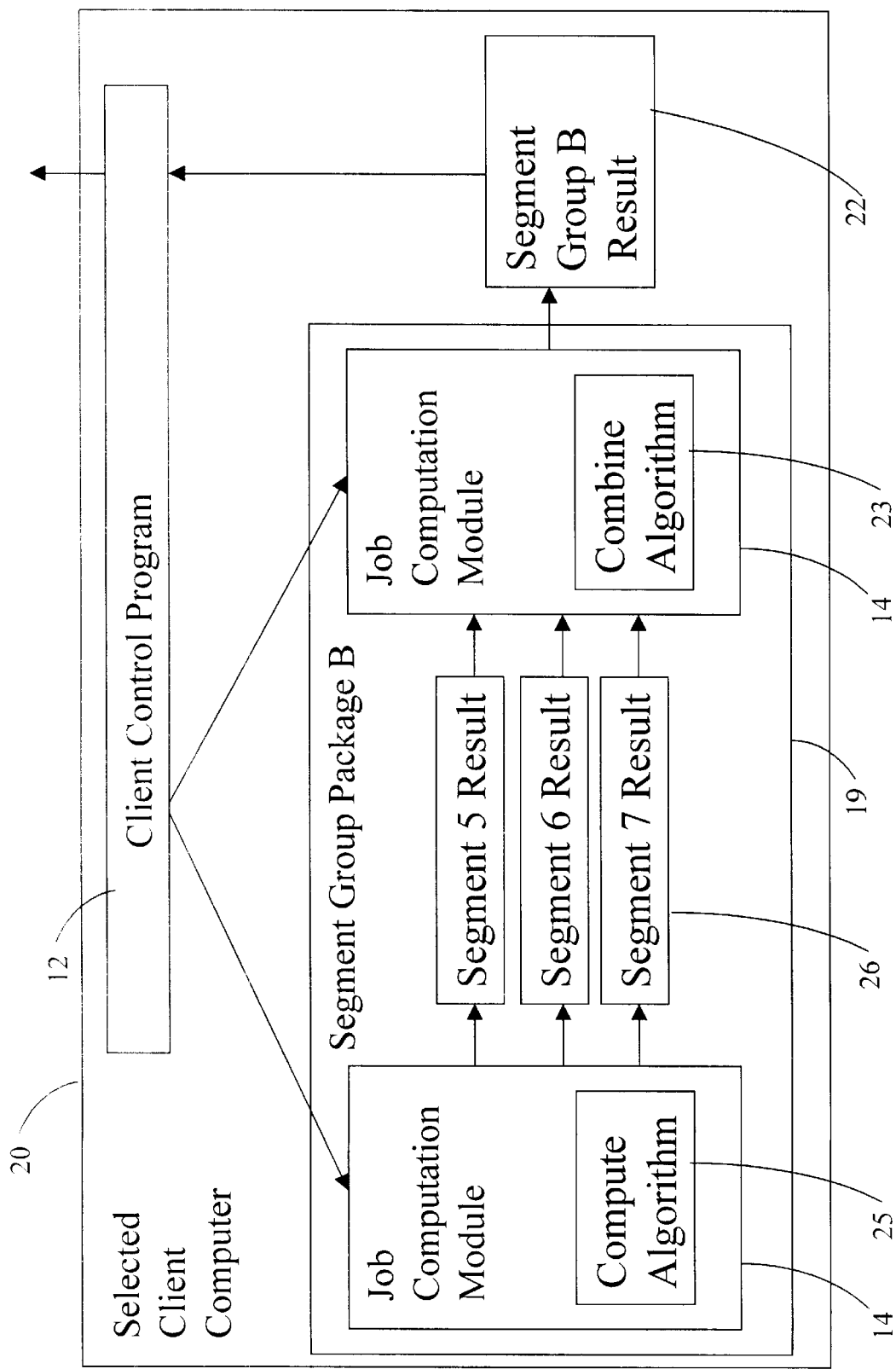
FIG. 3a,b. Computation of multiple segments and combination into a group result.
Figure 3B:
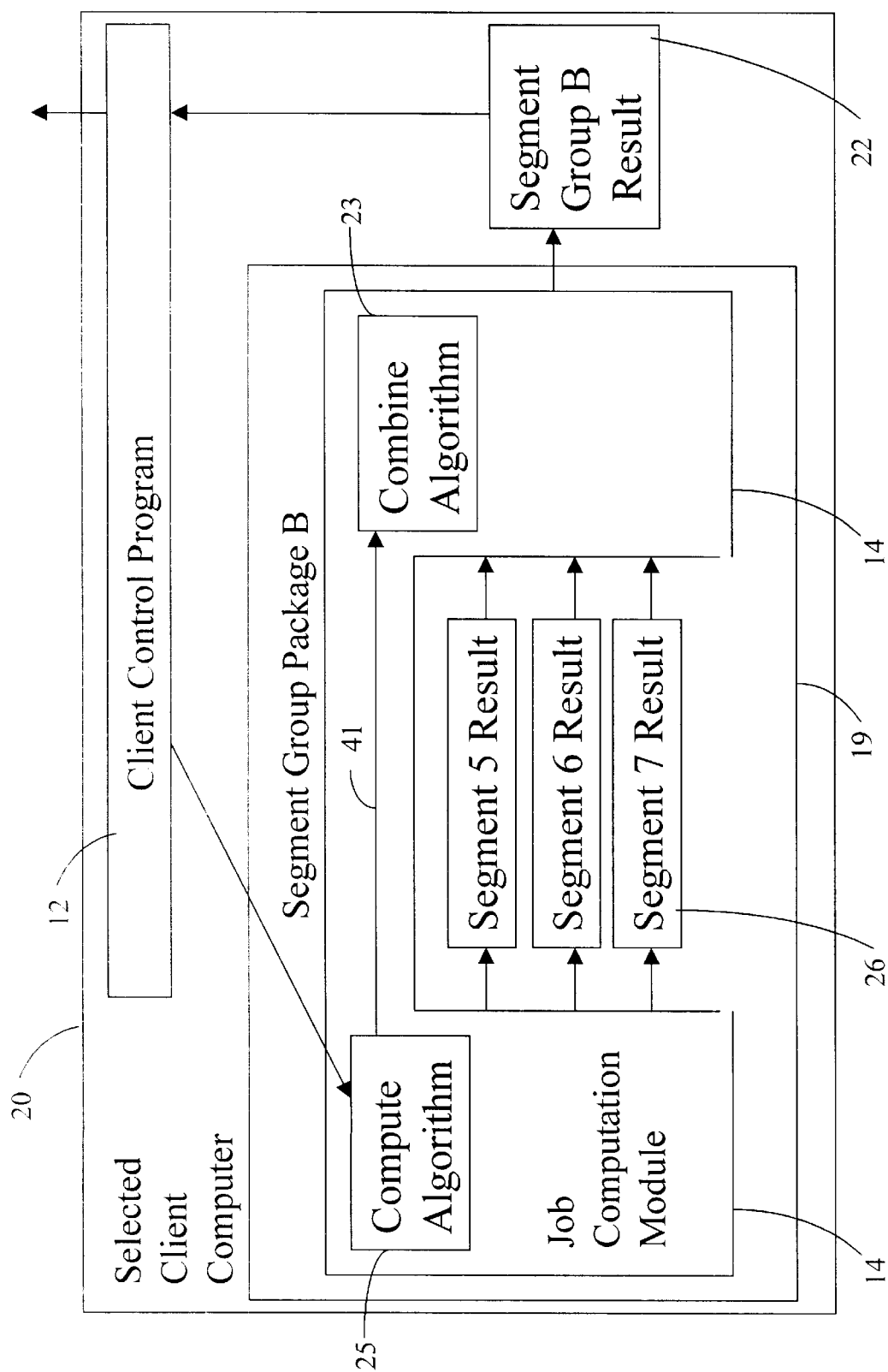

Referring to FIGS. 3a and 3b, while it is theoretically possible to limit the compute algorithm to one segment at a time and to then use the combine algorithm on all segment results, this is usually inefficient in practice. The compute algorithm preferably operates on a sequence of segments, and performs an internal combine operation 41 to produce a single group result. FIG. 3a illustrates the former approach, FIG. 3b the latter.

Returning to FIG. 5, when the job computation module 14 is invoked with a format parameter list 33, the format algorithm 24 takes a single result from one or more input files and formats one or more output files for display or further processing by the job output means.

The advantages of embodying the four modes in one job computation module include:

(a) Because algorithms for the four modes have much in common, the total size of code is minimized. This reduces the time required to transfer executable files across the network.

(b) With the need to maintain revision levels for only a single software module, there is no risk of cross-level incompatibilities between modes.

(c) The entire calculation can be tested easily on one computer by a simple sequence of size, compute, combine, and format invocations. Because the identical code will be executed in the non-distributed test case as in the distributed case, debugging in a complex distributed environment is avoided.

Returning to FIG. 2c, for each job request signal 40, the master control program's job control algorithm 47 executes the size algorithm 15 within the job computation module 14 to calculate the number of computation segments in the job request. The job control algorithm then defines segment groups containing one or more segments each. The grouping of segments can be based on a variety of methods including:

(a) assigning a constant number of segments per group, (b) dividing the number of segments by an expected number of available clients, the resulting quotient being the number of segments per groups, or (c) starting with one segment per group, measuring the subsequent client download and execute times, and adjusting the number of segments per group upward, and repeating the process until (i) a predetermined group compute time limit is reached or (ii) a download time to execute time ratio is reached. These adaptive schemes attempt to optimize resource utilization by using the fewest downloads while constraining overall computation time.

Figure 2D:
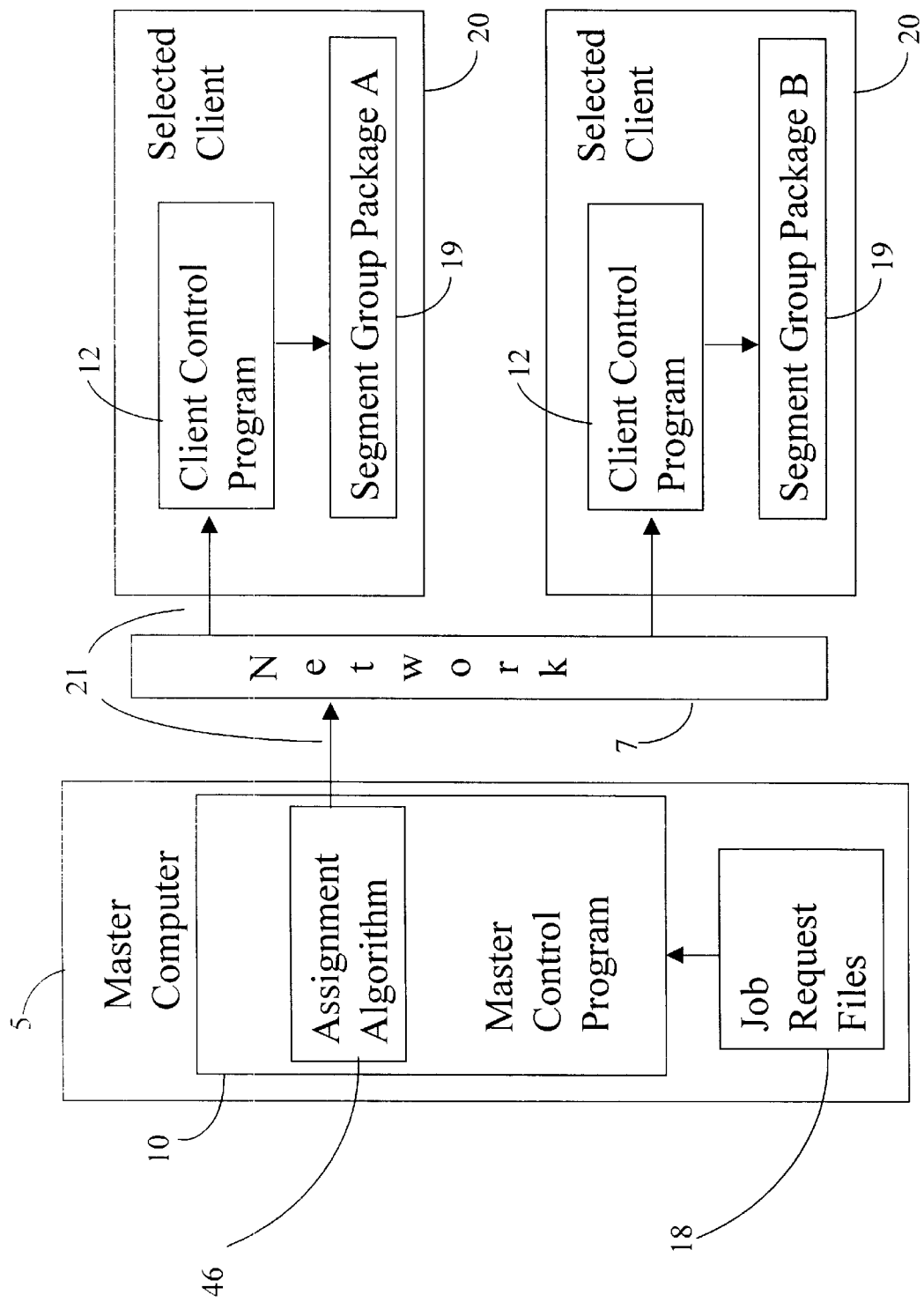

FIG. 2d depicts the invention when two available clients 17 have been qualified by the master control program's qualification algorithm 45 and assigned segment group packages 19 by the assignment algorithm 46. The available clients then become selected clients 20. Each selected client is controlled by sending commands and files 21 from the master control program to the client control program over the network. Each selected client is downloaded with the job request files 18 included in the segment group package 19 whose contents are based on the job request signal 40. FIG. 2d depicts one select client receiving the files constituting segment group package A, while the other selected client receives the files constituting segment group package B.

Figure 8C:
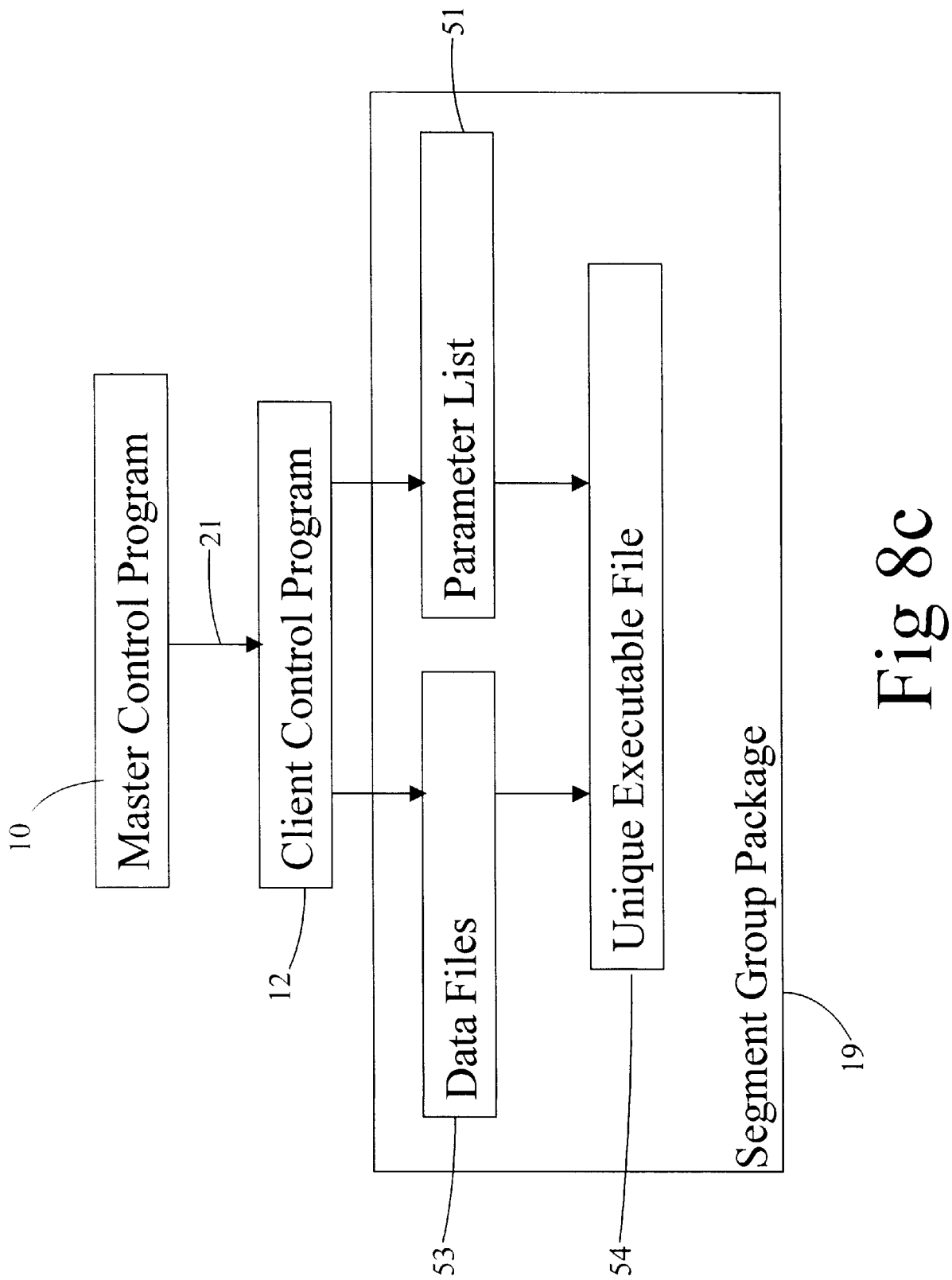

There are several variants in the makeup of a segment group package 19. FIGS. 8a–c depict three possibilities. FIG. 8a shows the case where the executable file is a common job computation module 50 that is common among all segment group packages 19. Likewise, all data files are common data files 49, i.e., they are common among all segment group packages. However, the command line provided to common job computation module 50 contains a unique parameter list 48 for each segment group package 19.

FIG. 8b shows the case where the data files are unique data files 52, and the parameter list 51 may or may not be unique. The executable file is still common among segment group packages.

FIG. 8c shows the case where the executable file is a unique executable file 54, while the parameter list 51 and the data files 53 may or may not be unique.

Returning to FIG. 2d, for each selected client, at the completion of the downloads the master control program 10 issues a command to the client control program 12 to execute the job computation module 14 with a compute parameter list 31. The compute parameter list contains the from-segment 38 and to-segment 39 for the specific segment group package 19 assigned to that selected client 20. The job computation module then executes the compute algorithm 23 via the mode select algorithm 28. The compute algorithm creates the output files named in the out-file list 37.

Figure 2E:
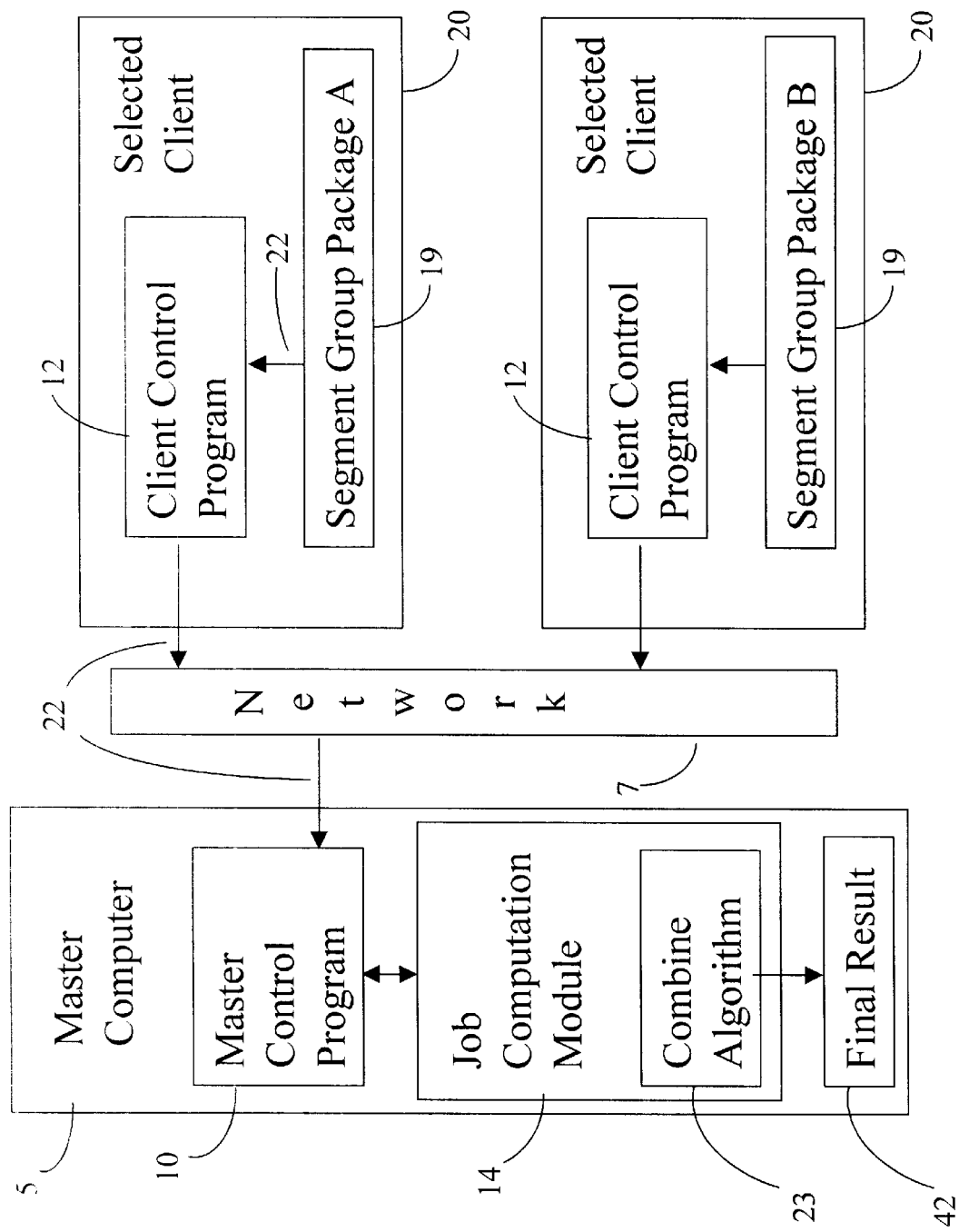

FIG. 2e depicts the invention when the two selected clients have asynchronously completed the compute algorithm 23. Each signals the master control program that the group result 22 is computed, whereupon the output files are uploaded to the master computer. To avoid the obvious file name duplication problems of multiple selected clients uploading files with the same names, the output files from each group are given unique names in master computer. This can be accomplished by appending the base file name with a unique group name or group number.

At the completion of the uploads from a selected client, the master computer may assign that selected computer another segment group package 19 for computation. If it does not, the client control program may be signaled from the master control program to erase any files downloaded or created by the segment group package 19. In addition, the client control program may include algorithms to detect local user activity or other predetermined grounds for terminating computation. In this case, all files are deleted and the client control program returns to an idle state. If the master control program does not receive timely status messages from a selected client, it will deem that selected client off-line and reassign the associated segment group package to another available computer. This provides a simple but robust tolerance of network failures or unexpected client computer terminations.

After all group results 22 have been computed and the associated output files uploaded from the selected clients, the master control program's job control algorithm 47 invokes the job computation module 14 with a combine parameter list 32 that causes the combine algorithm 23 to execute. The in-file list 36 for the combine algorithm is created by the job control algorithm 47 and contains the names of all the group output files that have been previously uploaded from the selected clients. The out-file list 37 contains the name or names of the file(s) intended to contain the final result 42.

Figure 2F:
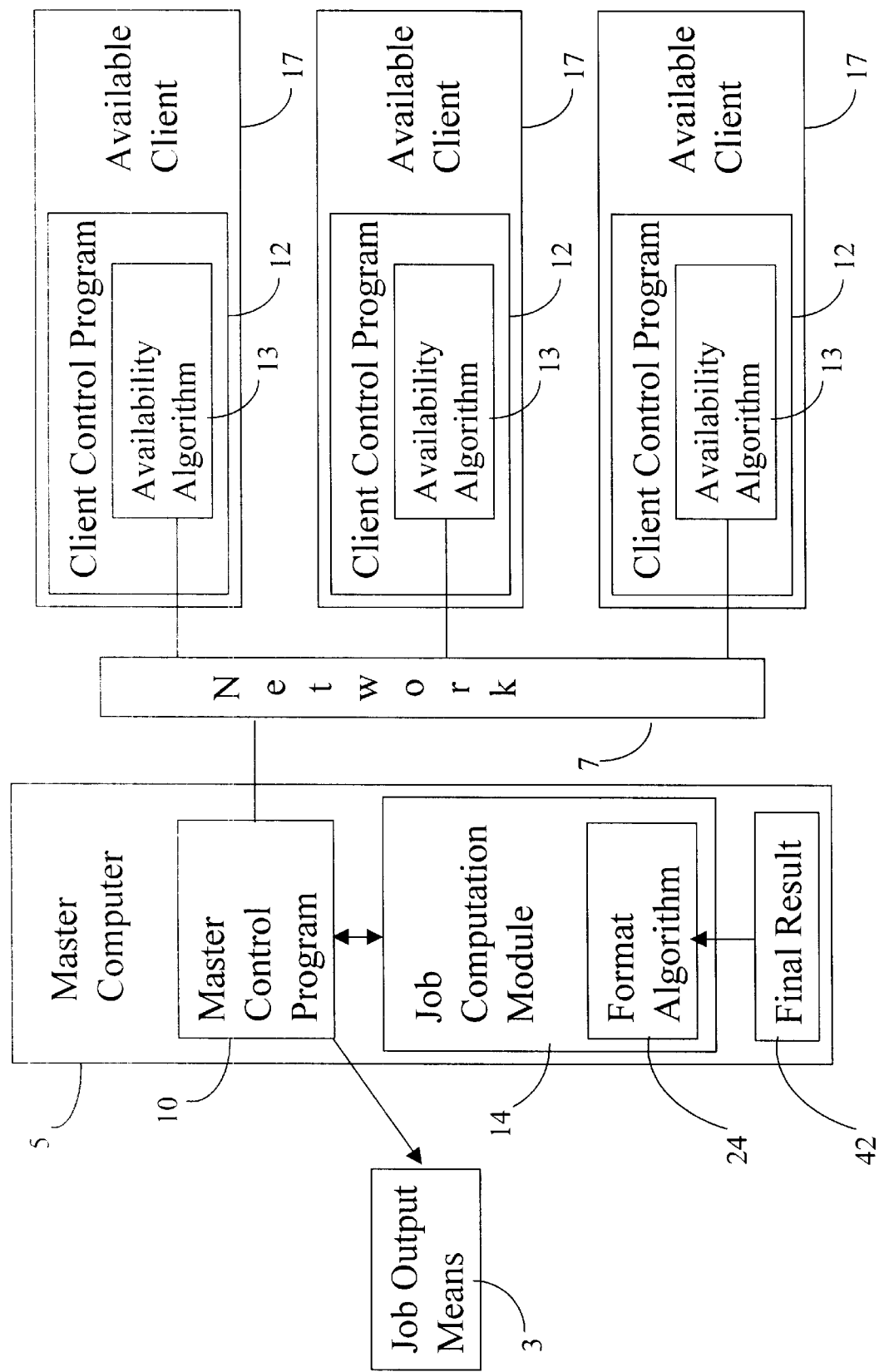

FIG. 2f depicts the final processing of a job request. The master control program 10 invokes the job computation module 14 with a format parameter list 33 that causes the format algorithm 24 to execute. In the format mode, the in-file list is identical to the out-file list from the previous combine parameter list, i.e., the output from the final combine is the input to the format. The format algorithm creates the output file or files specified in the out-file list in the format parameter list 33. The master control program 10 then forwards these formatted files to the job output means 3 for storage, display, etc.

In summary, FIG. 2a–2f show how the invention exploits the commonality of a variety of distributed computations: it is possible to structure them with the same four modes whose parameters include a single list of input files and output files. The invention allows any number of clients computers to contribute to the computation of any number of different problems in their idle time and with no application-specific software pre-installed or permanently resident on their disks.

FIG. 6 relates to a particularly useful example of the type of problems that can be conveniently and economically solved using the present invention. In this example, the problem set is defined as finding the minimum or maximum value of a calculated target cell in a spreadsheet, based on a number of input cells taking values within a specified range. This class of problem is extremely useful because the form and number of functions, relations, constraints, etc. is virtually unlimited and the definition of these is within the expertise of accounting and financial personnel that are usually not competent to quickly develop distributed applications.

FIG. 6 shows the spreadsheet submission form 43 for such a spreadsheet min/max problem. All that the user is required to provide are:

(a) a user-provided spreadsheet definition file, (b) a target cell and the selection to either minimize or maximize the target cell, and (c) one or more parameter cells and the from, to and step values defining all values each parameter is to take.

The form will accept optional report names for each cell. These are used in the formatting of the final result.

The job request means 1 presents to a user the spreadsheet submission form 43 shown in FIG. 6. This presentation could be in a dialog box or other window on a personal computer. Upon completion of the form, the job request means sends a job request signal 40 comprising:

(a) A job request message 44, (b) a job computation module name (in this case a spreadsheet interface program XLInterface), (c) an XSP file containing the contents of the form shown in FIG. 6, (d) the spreadsheet definition file, e.g., job.xls In this example, the size algorithm 15 within XLInterface computes the number of segments by reading the XSP input file and forming the product of the number of specified values each parameter may take. Each parameter corresponds to one dimension of a n-dimensional matrix, where n is the number of parameters. The compute algorithm 25 calculates the parameters values by using the segment number as an index into an equivalent one-dimensional table containing every permutation of parameter values. The from-segment 38 and to-segment 39 specified in the compute parameter list 31 in the command line define a unique subset of points in the parameter space. For each segment, the compute algorithm in the selected client calculates the corresponding parameters, inserts them into the appropriate cells in the spreadsheet, and calls a spreadsheet program to calculate the resulting value of target cell. The compute algorithm then reads the target cell value from the spreadsheet program and using the min/max specification in the XSP input file, finds the minimum or maximum target cell value for the range of segments assigned to the segment group package. It creates an output file with the best target value and the parameter values associated with the best target value. While many means exist of invoking a spreadsheet program from another program, XLInterface uses Microsoft's OLE (Object Linking and Embedding) Automation technology to invoke the Excel spreadsheet program.

The combine algorithm 23 is executed by the master control program 10. It uses the min/max specification in the XSP file to combine the group results 22 by simply selecting the group result with the minimum or maximum target value. This best of the best target value and the associated parameter values are stored as the final result 42.

The format algorithm 24 reads the final result 42 and produces a text report for display by the job output means 3, that in this case could be a display window on a personal computer.

The appendix comprises C language source code for a working prototype of the presently preferred embodiment. The master control program 10 is implemented as a dynamic linked library, isapijfd.dll, providing a custom extension to the Microsoft Internet Information Server. The client control program 12 and availability algorithm 13 are part of client.c. A simple job computation module 14, dummy.c, shows an example of one program supporting four operational modes. All programs were developed with Microsoft's Visual C++ Version 5.0.

The first source file, isapijfd.cpp, is the master control program. The persistent state information is gathered in a single structure "State" to facilitate an easy snapshot of system state to disk. "State" comprises three arrays of data structures: "Submitters" correspond to job request means 1 and job output means 3, "Contributors" correspond to available client computers 17, and "Jobs" corresponds to job request signals 40. The program is structured as a combination of finite state machines. All activity is the result of input messages from somewhere, and every input message results in exactly one return output message. As an extension to a network server, the entry points to isapijfd.dll correspond to message types of received messages. The entry points, implemented as C++ methods, start on the bottom of page 6 with GetJobNumber, and continue on page 7 with Submit, SubmitterTick, Cancel, and Client. All but Client deal with messages from submitters. Client is the sole entry point dealing with clients. It handles several message subtypes.

A job is submitted by a submitter sending a GetJobNumber message. If there is a free job structure, it is allocated, partially initialized, and the corresponding job number is sent to the submitter. This job number is also used as part of the name of a subdirectory to store files corresponding with a job. Next, the submitter sends a Submit message, i.e., a job request signal 40. The form of the message is as depicted in FIG. 7. The contents of the message are stored in the character array Script in the structure JOB. Each line of the script is then executed, one at a time, in response to periodic incoming SubmitterTick messages. For example, if an UPLOAD command is to be executed, an UPLOAD command message is sent to the submitter as the response to his next SubmitterTick. The submitter will then initiate a file transfer to the master computer 5. This process will continue until all specified files are uploaded.

When the CALCULATE script line is processed, the job structure initialization is completed in preparation for accepting offers from clients. The job computation module 14 name is the parameter of the CALCULATE command. The job computation module is executed with the SIZE mode to compute the range of segments required to process. The size of segment groups, that is the number of segments in a group, is determined by the routine CalculateSegmentSize. In this example, the size is fixed at ten. Other preparation includes building a list of files to download to clients, based on the IN and OUT script lines immediately following the CALCULATE line. After the CALCULATE script line is executed, subsequent SubmitterTick messages cause a job status message to be returned. This will continue until the job is completed, or a Cancel message is received from the submitter.

Asynchronously with submitter messages, client computers send a Client message with one of the message subtypes defined on page 1 under "From Contributor Messages". Each new client gets a CONTRIBUTOR structure allocated to it. This structure will maintain the state of the client. As seen in the definitions and the StateX array on page 1, the state of a client is defined by the last message sent to it. The top level logic in handling client messages is performed by the routine ContributorTransition on page 4. The actions in response to a Client message fall into the following categories: tell client to download a file, tell client to execute a program file, tell client to upload a file, tell client to reset, or tell client to do nothing for a period of time.

As will be seen below in the discussion of client.c, the client computer is treated as a slave to the master control program isapijfd.dll. The client has no idea what to do other than obey a single command from isapijfd.dll. If there is any mismatch between isapijfd.dll's expected response from a client and what is received, the client is reset. As part of processing SubmitterTicks, isapijfd.dll detects time-out's from any client assigned to the submitters job. A time-out causes the client's state to be reset and the job's state to be restored as if the client never existed. This finite state machine behavior of isapijfd.dll is a key to the robustness of the invention to communication failures, client failures, or client abandonment of its participation in the distributed computation.

Client.c is listed on pages 7–10. It also uses a state machine as the heart of its logic. Client.c has two entry points from its parent program. InitClient, on page 10, is called once at the beginning of execution. It calls the availability algorithm 13 in routine CheckAvailability, which checks to see if the spreadsheet program Excel is installed on the computer. If so, this will be reported to the master computer. The second entry point, ClientTimer, is called on a periodic basis, e.g., once per second. It calls SendMsg, the routine that executes the state machine. The state table NewState contains the new state, given the current state and the last received message. The table FuncTable contains vectors to action routines to be performed prior to the state transition. The routine SXGet downloads a file from the master computer. The routine SXPut uploads a file. SXExc executes a command line in a new execution thread. SXRst resets the client computer's local state. In this example, reset does nothing. In the preferred embodiment of the invention, the reset function would delete all files created by the client control program. SXAck tells the client to wait for a number of seconds specified by the master before sending its next message. This allows the master control program to throttle the status messages from its clients to avoid overloading the communications network. SXChk checks to see if the executing thread has finished. If so, an FCM_FINISHED_EXECUTING status is reported to the master.

Client.c is a module that can be called from any executable program. In the presently preferred embodiment, client.c is part of a screen saver program that automatically executes, via the client computer's operating system, after a period of user inactivity. Any mouse or keyboard activity automatically and immediately terminates the program. As can be seen in the logic of the master control program isapijfd.dll, discussed above, the invention is designed to tolerate such sudden client terminations.

The last program listing, on page 10, is dummy.c This is a trivial but illustrative example of a job computation module designed to support the four operational modes: size, calculate, combine, and format. The program performs the mathematical function of adding a range of integers. Dummy.c shows how the present invention's architecture allows a mathematical problem to easily be programmed and solved without regard to the complexities of communications networks, distributed operating systems, or fault tolerance.

The method and system of the present invention facilitate the rapid solution of a large class of distributed computing problems using the idle time of existing computers. They eliminate the cost of providing additional computers to perform distributed computation. They allow distributed algorithms to be implemented without regard to network or system architecture. They provide automatic recovery from communications or client computer failures. They permit non-programmers to easily define and more quickly solve optimization problems using conventional spreadsheets and a simple job submission form.

The above description should not be construed as limiting the scope of the invention but as merely providing illustrations of the presently preferred embodiment of this invention. For example:

The client control program may be implemented as a plug-in to an Internet browser.

The availability algorithm may be implemented outside the client control program.

The availability algorithm may be implemented as a plug-in to an Internet browser.

The client control program and/or job computation module could be implemented in a language such as JAVA that may protect the client computer from harmful applications.

The client computers could be anywhere on the Internet, participating on a cooperative basis.

Communications between master and client computers could be encrypted or otherwise secured.

File storage on the client computer could be encrypted or otherwise secured.

Client computers could restrict the type of problems they are available to solve based on resource requirements, e.g., problems that don't require any disk use.

Client computers could restrict the type of problems they are available to solve based on the source of the job request.

Job requests could restrict the identities of clients that are selected to contribute to the job.

The job computation module could be divided into several modules to perform the various mode functions.

The from-segment and to-segment could be specified in the job request signal rather than calculated by the size algorithm.

Distributed computations can include searches of databases or searches of intranets or the Internet.

A memory based file system could be implemented in the client control program to allow job computation modules to use file system services but protect the client computer from any disk accesses.

Repetitious file downloads could be avoided when a client computer processes several segment groups in sequence.

The availability algorithm could tolerate various levels of user or background activity and still conclude that a client computer is available.

Client computers in the context of the invention could include networked servers in which case availability criteria could vary from those for desktop computers.

The job request means could be a periodically scheduled program executing on the master computer or another computer.

The availability algorithm could be a periodically scheduled program executing on a client computer.

The availability algorithm could consider one or more factors in determining availability, including time of last user activity, pattern of user activity, time-of-day, day-of-week, scheduled holidays.

Thus, the scope of the invention should be determined by the appended claims and their legal equivalents, rather than by the examples given.

I claim:

1. A method for performing one or more distributed computations on a plurality of general purpose computers that are connected by a communications network, each distributed computation comprising a hierarchy of (i) one or more subordinate computation segments distributed among the computers, each segment producing a segment result, and (ii) one or more combine functions that combine the results of subordinate computation segments into a combined result, the hierarchy arranged such that a topmost combine function produces a final result, wherein the method comprises:

providing a master computer;
providing a plurality of client computers;
executing on the master computer a master control program, where the master control program is applications independent and includes a qualification algorithm and an assignment algorithm;
executing on each client computer an availability algorithm;
connecting the availability algorithms to the master control program via a communications network;
providing a job request means in signal connection to the master control program;
providing a job output means in signal connection to the master control program;
submitting one or more job requests for distributed computation via the job request means to the master control program, each job request including one or more files or file references required to perform the distributed computation, the files or file references including an executable job computation module;
determining by the availability algorithm asynchronously on each of one or more client computers whether the client computer is an available client;
for each available client,
  (a) sending an availability message from the available client via the network to the master control program, where the availability message signals the readiness of the available client to participate in one or more distributed computations,
  (b) determining by the qualification algorithm in the master control program whether the available client shall be declared a selected client for a particular job request,
for each selected client for a particular job request:
  (a) executing on the selected client a client control program, where the client control program is application independent;
  (b) defining by the assignment algorithm in the master control program a segment group package containing one or more computation segments and the combine function,
  (c) downloading the segment group package to the selected client via the network,
  (d) computing the group result by performing the computation segments and group combine function under the control of the client control program on the selected client,
  (e) communicating the group result via the network to the master control program;
computing the final result by the combine algorithm in the master computer;
communicating the result to the job output means via a job output signal;
whereby, through the use of idle time on a plurality of networked general purpose computers, the results of distributed computations are produced more economically than they could be produced using dedicated computers.

2. The method of claim 1, wherein the availability algorithm is embodied in a program activated by a screen saver feature of the client computer's operating system.

3. The method of claim 1, wherein the availability algorithm is embodied in a program executed on a periodic, scheduled basis.

4. The method of claim 1 where the client control program is executed by a network browser.

5. The method of claim 1 where the availability algorithm is executed by a network browser.

6. The method of claim 1 where the availability algorithm includes functions of one or more parameters selected from the group consisting of: time of user inactivity, pattern of user activity, time-of-day, day-of-week, scheduled holidays.

7. The method of claim 1 where the master control program and the client control program invoke copies of a single executable job computation module in distinct modes, the distinct modes performing functions including one or more from the group consisting of:

calculate the number of subordinate computation segments based on the contents of one or more files included or referenced in the job request, calculate one or more computation segment results, perform the combine function, format the final result for storage or presentation on the output means.

8. The method of claim 1, wherein the master control program calculates (a) a download time required to download the segment group package to each selected client and (b) a compute time required by the each selected client to compute the group result, wherein the assignment algorithm adaptively computes the preferred number of computation segments in an segment group package based on previously calculated download times and compute times for one or more selected clients, whereby the total time required to produce the final result is reduced.

9. The method of claim 1, wherein the job request means communicates resource requirements in conjunction with requests for distributed computation, wherein the availability algorithm (i) determines a resource profile including the existence and configuration of specific resources on the client computer and (ii) communicates the profile to the master control program, wherein the qualification algorithm compares the resource requirements of each request to the resource profile of each available client in selecting the available client to be a selected client.

10. The method of claim 9, wherein resource requirements include one or more requirements selected from the group consisting of:

(a) a particular spreadsheet program is previously installed on the client computer, (b) a particular operating system is previously installed on the client computer, (c) a particular CPU type or family is installed on the client computer, (d) a specified amount of disk space is available on the client computer, and (e) a specified amount of main CPU memory is installed on the client computer.

11. A system for performing one or more distributed computations on a plurality of general purpose computers that are connected by a communications network, each distributed computation comprising a hierarchy of (i) one or more subordinate computation segments distributed among the computers, each segment producing a segment result, and (ii) one or more combine functions that combine the results of subordinate computation segments into a combined result, the hierarchy arranged such that a topmost combine function produces a final result, wherein the system comprises:

a master computer;

a job request means in signal connection to the master computer used to submit one or more job requests for distributed computation, the job request including one or more files or file references required to perform the distributed computation, the files or file references including an executable job computation module;

a plurality of client computers;

a communications network connecting the client computers to the master computer;

an availability algorithm executing on each client computer, where the availability algorithm determines whether the client computer is an available client;

an availability signal from the availability algorithm on each of the available clients sent via the network to the master control program, where the signal indicates the readiness of each available client to participate in one or more distributed computations;

a client control program on each selected client that:

(a) computes the group result by performing the assigned computation segments and group combine function, (b) communicates the group result via the network to the master control program;

a job output means in signal connection to the master computer, the job output means used to present and/or store of the results of distributed computation;

a master control program executing on the master computer, where the master control program is applications independent and includes logic for accepting job requests, coordinating the execution of computation segments by client computers, collecting group results sent by the client computers, computing the final result by the combine function, communicating the final result to the job output means via a job output signal;

a qualification algorithm subordinate to the master control program, the qualification algorithm determining, for each available client, whether the available client shall be declared a selected client for a particular job request, an assignment algorithm subordinate to the master control program, the assignment algorithm (i) defining for a selected client a segment group package containing one or more computation segments and the combine function and (ii) downloading the segment group package to the selected client via the network, whereby, through the use of idle time on a plurality of networked general purpose computers, the results of distributed computations are produced more economically than they could be produced using dedicated computers.

12. The system of claim 11, wherein the availability algorithm is embodied in a program activated by a screen saver function of the client computer's operating system.

13. The system of claim 11, wherein the availability algorithm is embodied in a program executed on a periodic, scheduled basis.

14. The system of claim 11 where the client control program is executed by a network browser.

15. The system of claim 11 where the availability algorithm is executed by a network browser.

16. The system of claim 11 where the availability algorithm includes functions of one or more parameters selected from the group consisting of time of user inactivity, pattern of user activity, time-of-day, day-of-week, scheduled holidays.

17. The system of claim 11 where the master control program and the client control program invoke copies of a single executable job computation module in distinct modes, the distinct modes performing functions including one or more from the group consisting of:

calculate the number of subordinate computation segments based on input files, calculate one or more computation segment results, perform the combine function, format the final result for presentation on the output means.

18. The system of claim 11, wherein the master control program calculates
    (a) a download time required to download the segment group package to each selected client and
    (b) a compute time required by the each selected client to compute the group result, wherein the assignment algorithm adaptively computes the preferred number of computation segments in a segment group package based on previously calculated download times and compute times for one or more selected clients, whereby the total time required to produce the final result is reduced.

19. The system of claim 11, wherein the job request means communicates resource requirements in conjunction with requests for distributed computation, wherein the availability algorithm (i) determines a resource profile including the existence and configuration of specific resources on the client computer, and (ii) communicates the profile to the master control program, and wherein the qualification algorithm compares the resource requirements of each request to the resource profile of each available client in selecting the available client to be a selected client.

20. The system of claim 19, wherein resource requirements include one or more requirements selected from the group consisting of
    (a) a particular spreadsheet program is previously installed on the client computer,
    (b) a particular operating system is previously installed on the client computer,
    (c) a particular CPU type or family is installed on the client computer,
    (d) a specified amount of disk space is available on the client computer,
    (e) a specified amount of main CPU memory is installed on the client computer.

* * * * *